United States Patent
Pan et al.

(10) Patent No.: US 11,449,898 B2
(45) Date of Patent: Sep. 20, 2022

(54) METHOD, DEVICE, AND STORAGE MEDIUM FOR RECOMMENDING POINT OF INTEREST FOR LOCATION-BASED SERVICE

(71) Applicant: Tencent Technology (Shenzhen) Company Limited, Shenzhen (CN)

(72) Inventors: Guangmou Pan, Shenzhen (CN); Fanshuo Kong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 42 days.

(21) Appl. No.: 16/891,920

(22) Filed: Jun. 3, 2020

(65) Prior Publication Data

US 2020/0294091 A1    Sep. 17, 2020

Related U.S. Application Data

(63) Continuation of application No. PCT/CN2019/078761, filed on Mar. 19, 2019.

(30) Foreign Application Priority Data

Apr. 12, 2018 (CN) .......................... 201810325820.6

(51) Int. Cl.
    *G06Q 30/02* (2012.01)
    *G06Q 50/00* (2012.01)
    *H04L 67/52* (2022.01)

(52) U.S. Cl.
    CPC ......... *G06Q 30/0261* (2013.01); *G06Q 50/01* (2013.01); *H04L 67/52* (2022.05)

(58) Field of Classification Search
    None
    See application file for complete search history.

(56) References Cited

U.S. PATENT DOCUMENTS 9,243,913 B1 *   1/2016   Lehman ................. G01C 21/00
2006/0026067 A1 *   2/2006   Nicholas ............ G06Q 30/0261
                                                705/14.58

(Continued)

FOREIGN PATENT DOCUMENTS

CN    103023977 A    4/2013
CN    103167404 A    6/2013

(Continued)

OTHER PUBLICATIONS

Adapting to User Interest Drift for POI Recommendation; Yin et al., IEEE Transactions on Knowledge and Data Engineering, vol. 28, No. 10, Oct. 2016.*

(Continued)

*Primary Examiner* — David J Stoltenberg
(74) *Attorney, Agent, or Firm* — Crowell & Moring LLP

(57) ABSTRACT

The present disclosure describes a method, a device, and storage medium for recommending a point of interest (POI) for location-based services (LBSs). The method includes determining, by a device, a target region according to a location of a user. The target region is a geographic region obtained by dividing an electronic map based on Mercator coordinates. The device includes a memory storing instructions and a processor in communication with the memory. The method includes obtaining, by the device, at least one target POI, the at least one target POI being selected according to an influence, the influence comprising at least one of a target-region influence, a smooth-window-region influence, and a fused-region influence; and outputting, by the device, the at least one target POI.

17 Claims, 9 Drawing Sheets

(56) References Cited

U.S. PATENT DOCUMENTS

| | | | | |
|---|---|---|---|---|
| 2009/0177486 | A1* | 7/2009 | Irish | H04L 67/02 705/347 |
| 2010/0010897 | A1* | 1/2010 | Tyler | G06Q 30/0261 705/14.58 |
| 2011/0313968 | A1* | 12/2011 | Dumais | G06F 16/22 706/52 |
| 2012/0046017 | A1* | 2/2012 | Jennings | G06Q 30/0204 709/225 |
| 2013/0262479 | A1 | 10/2013 | Liang et al. | |
| 2013/0337830 | A1* | 12/2013 | Haro | G06Q 50/01 455/456.1 |
| 2014/0162694 | A1* | 6/2014 | Maier | H04W 4/029 455/456.3 |
| 2014/0172896 | A1* | 6/2014 | Yu | G09B 29/106 707/758 |
| 2014/0304130 | A1* | 10/2014 | Winters | G06Q 30/0226 705/35 |
| 2014/0336926 | A1* | 11/2014 | Udeshi | G01C 21/367 701/457 |
| 2016/0019592 | A1* | 1/2016 | Muttineni | H04W 4/029 705/14.58 |
| 2016/0132513 | A1* | 5/2016 | Lim | G06F 16/29 707/724 |
| 2016/0180386 | A1* | 6/2016 | Konig | G06Q 30/0255 705/14.55 |
| 2017/0061024 | A1 | 3/2017 | Tsuboi | |
| 2017/0205242 | A1* | 7/2017 | Schmidt | G01C 21/3811 |
| 2018/0096498 | A1* | 4/2018 | Hartmann | G06F 16/9538 |
| 2018/0112995 | A1* | 4/2018 | Bortolussi | G01C 21/3476 |
| 2018/0137204 | A1* | 5/2018 | Zhang | G06F 16/9535 |
| 2018/0174189 | A1* | 6/2018 | Joseph | H04W 4/21 |
| 2018/0189990 | A1* | 7/2018 | Cardno | G06Q 10/10 |
| 2019/0180480 | A1* | 6/2019 | Gao | G06T 11/001 |

FOREIGN PATENT DOCUMENTS

| | | | |
|---|---|---|---|
| CN | 104090970 A | 10/2014 | |
| CN | 104112213 A | 10/2014 | |
| CN | 105528384 A | 4/2016 | |
| CN | 105677804 A | 6/2016 | |
| CN | 107085600 B * | 3/2017 | G06F 16/9535 |
| CN | 106611004 A | 5/2017 | |
| CN | 106844376 A | 6/2017 | |
| CN | 106909560 A | 6/2017 | |

OTHER PUBLICATIONS

Research and Implementation of POI Recommendation System Integrating Temporal Feature; Liu et al., 2018 IEEE 3rd International Conference on Big Data Analysis.*

Social Topic Modeling for Point-of-Interest Recommendation in Location-based Social Networks, Hu et al., 2014 IEEE International Conference on Data Mining.*

Mining Customer Preference in Physical Stores From Interaction Behavior, Chen et al., Sep. 19, 2017, Digital Object Identifier 10.1109/ACCESS.2017.2744263.*

An Algorithm for LBS-based Schedule Recommendation with Time Constraint, Yuxiang et al., 2015 12th Web Information System and Application Conference.*

International Search Report with English translation and Written Opinion regarding PCT/CN2019/078761 dated Jun. 3, 2019, 9 pages.

Chinese Office Action with concise translation regarding CN2018103258206 dated Sep. 27, 2021.

* cited by examiner

METHOD, DEVICE, AND STORAGE MEDIUM FOR RECOMMENDING POINT OF INTEREST FOR LOCATION-BASED SERVICE

RELATED APPLICATIONS

This application is a continuation application of PCT Patent Application No. PCT/CN2019/078761, filed on Mar. 19, 2019, which claims priority to Chinese Patent Application No. 201810325820.6, LOCATION-BASED SERVICES filed with the National Intellectual Property Administration, PRC on Apr. 12, 2018, both of which are incorporated herein by reference in their entireties.

FIELD OF THE TECHNOLOGY

This application relates to the field of Internet technologies, and in particular, to a point of interest (POI) recommendation method and apparatus for location-based services (LBSs), a network device, and a storage medium.

BACKGROUND OF THE DISCLOSURE

Points of interest (POIs) distributed in a city may be used as landmarks (geographic markers) to constitute people's basic impressions of the city, for example, shopping malls, premium hotels, traffic hubs, city parks, places of interest, recreation and entertainment sites, important government departments, cultural and educational sites, hospitals, mansions, or residence communities. POIs are core data for location-based services (LBSs), may be applied to fields such as electronic maps or advertisement pushing. For example, a specific POI displayed in an electronic map is used as a destination selected before navigation, or restaurants, hotels, or the like around a user are viewed in a plurality of POIs displayed in an electronic map. A network device may evaluate an influence of a POI on surroundings of the POI based on a quantity of check-ins and a quantity of presentations of the POI obtained through statistic collection. However, different POIs have different influence ranges, an influence of a POI cannot be evaluated accurately by using one POI dimension only, resulting in relatively low accuracy of a recommended POI and relatively low service quality of an LBS.

SUMMARY

According to various embodiments provided in this application, a POI recommendation method and apparatus for location-based services, a network device, and a storage medium are provided.

The present disclosure describes a method for recommending a point of interest (POI) for location-based services (LBSs). The method includes determining, by a device, a target region according to a location of a user. The target region is a geographic region obtained by dividing an electronic map based on Mercator coordinates. The device includes a memory storing instructions and a processor in communication with the memory. The method includes obtaining, by the device, at least one target POI in the target region, the at least one target POI being selected according to an influence, the influence comprising at least one of a target-region influence, a smooth-window-region influence, and a fused-region influence; and outputting, by the device, the at least one target POI.

The present disclosure describes a device for recommending a point of interest (POI) for location-based services (LBSs). The device includes a memory storing instructions; and a processor in communication with the memory. When the processor executes the instructions, the processor is configured to cause the device to determine a target region according to a location of a user, the target region being a geographic region obtained by dividing an electronic map based on Mercator coordinates, obtain at least one target POI in the target region, the at least one target POI being selected according to an influence, the influence comprising at least one of a target-region influence, a smooth-window-region influence, and a fused-region influence, and output the at least one target POI.

The present disclosure describes a non-transitory computer readable storage medium storing computer readable instructions. The computer readable instructions, when executed by a processor, causing the processor to perform determining a target region according to a location of a user, the target region being a geographic region obtained by dividing an electronic map based on Mercator coordinates; obtaining at least one target POI in the target region, the at least one target POI being selected according to an influence, the influence comprising at least one of a target-region influence, a smooth-window-region influence, and a fused-region influence; and outputting the at least one target POI.

To resolve the foregoing technical problems, according to a first aspect, an embodiment of this application provides a POI recommendation method for location-based services. The method includes:

determining, by the network device, a target region according to a current location of a user, the target region being a geographic location range obtained by dividing an electronic map based on Mercator coordinates, the Mercator coordinates being coordinates obtained through a Mercator projection;

obtaining, by the network device, a to-be-recommended target POI in the target region, the target POI being at least one POI selected according to an influence, the influence including at least one selected from a group including a target-region influence, a smooth-window-region influence, and a fused-region influence; and outputting, by the network device, the target POI.

According to a second aspect, an embodiment of this application provides a POI recommendation apparatus for location-based services. The apparatus includes units configured to perform the method according to the first aspect.

According to a third aspect, an embodiment of this application provides a non-volatile computer-readable storage medium, storing a computer-readable instruction, the computer-readable instruction, when executed by one or more processors, causing the one or more processors to perform the following operations:

determining a target region according to a current location of a user, the target region being a geographic location range obtained by dividing an electronic map based on Mercator coordinates, the Mercator coordinates being coordinates obtained through a Mercator projection;

obtaining a to-be-recommended target POI in the target region, the target POI being at least one POI selected according to an influence, the influence including at least one selected from a group including a target-region influence, a smooth-window-region influence, and a fused-region influence; and outputting the target POI.

According to a fourth aspect, an embodiment of this application provides a network device, including a memory and a processor, the memory storing a computer-readable instruction, the computer-readable instruction, when executed by the processor, causing the processor to perform the following operations:

determining a target region according to a current location of a user, the target region being a geographic location range obtained by dividing an electronic map based on Mercator coordinates, the Mercator coordinates being coordinates obtained through a Mercator projection;

obtaining a to-be-recommended target POI in the target region, the target POI being at least one POI selected according to an influence, the influence including at least one selected from a group including a target-region influence, a smooth-window-region influence, and a fused-region influence; and outputting the target POI.

Details of one or more embodiments of this application are provided in the accompany drawings and description below. Other features, objectives, and advantages of this application become apparent from the specification, the accompanying drawings, and the claims.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from the accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

Figure 1A:
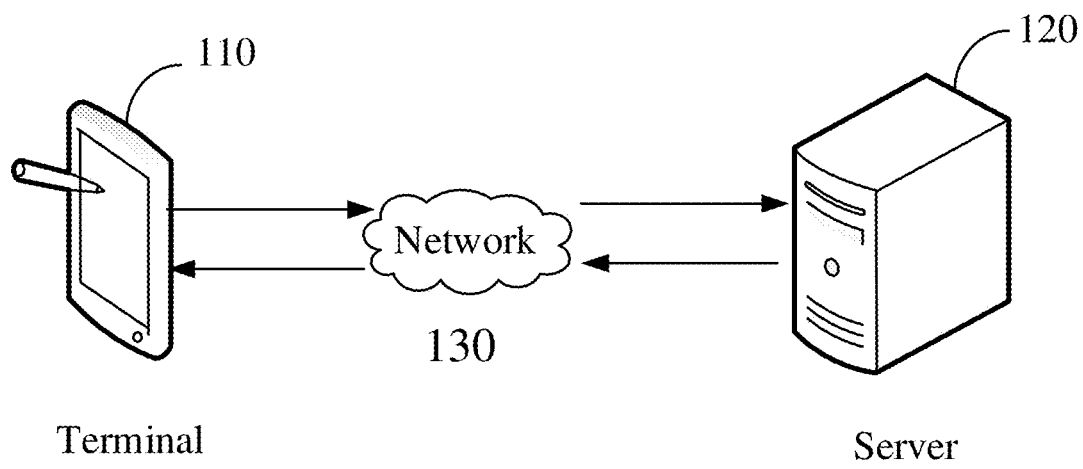
FIG. 1A is a diagram of an application environment of a POI recommendation method for location-based services in an embodiment.

FIG. 1A is a diagram of an application environment of a point of interest (POI) recommendation method for location-based services according to some embodiments. Referring to FIG. 1A, a terminal 110 and a server 120 are included. The terminal 110 may send a POI push request to the server 120, for example, to request the server 120 to push information or at least one POI about restaurants, hotels, or the like around a location at which a user is located. The server 120 obtains a current location of the user, determines a target region according to the current location of the user, obtains a to-be-recommended target POI in the target region, and sends the target POI to the terminal 110 after obtaining the target POI. In one implementation, the target POI may be displayed in an electronic map of the terminal 110. In another implementation, the to-be-recommended target POI may be obtained outside the target region.

The POI recommendation method for location-based services provided in the embodiments of the present disclosure may be further applied to a social application, for example, may be applied to a location check-in service of the social application. When receiving a location check-in request sent by the terminal 110, the server 120 performs the POI recommendation method for location-based services provided in the embodiments of this application to obtain a recommended target POI. The target POI may be displayed on the social application of the terminal 110. The terminal 110 uses the target POI selected by the user as a POI at which the user is currently located to implement a location check-in. In one implementation, the location check-in request may be implemented as a location like-request. When the terminal 110 receives the location like-request for a POI from the server 120, a user of the terminal 110 may check-in to like the POI.

The server 120 may be an independent physical server, or may be a physical server cluster including a plurality of physical servers, or may be a cloud server providing basic cloud computing services such as a cloud server, a cloud database, cloud storage, and a content delivery network (CDN). The terminal 110 may be a smartphone, a tablet computer, a notebook computer, a desktop computer, a smart speaker, a smartwatch, or the like, but is not limited thereto. The terminal 110 and the server 120 may be connected in a communication connection manner such as a network 130. No limitation is imposed in the present disclosure.

A POI recommendation method for location-based services is provided in the embodiments of this application. A network device may obtain a location of a user, determine a target region according to the location of the user, obtain a to-be-recommended target POI affecting the target region, and output the target POI.

The network device may obtain at least two regions by dividing an electronic map based on Mercator coordinates. The target region is a geographic location range obtained by dividing the electronic map based on the Mercator coordinates. A Mercator projection is a positive axis isometric cylindrical projection. Assuming that a cylinder in line with a direction of the earth's axis cuts through the earth, the graticule is projected onto a cylindrical surface according to an isometric condition, and the Mercator projection is obtained after unfolding the cylindrical surface into a plane. Coordinates obtained through the Mercator projection are Mercator coordinates. Using the schematic diagram of an interface of an electronic map shown in FIG. 1B as an example, the electronic map may include a plurality of regions, Mercator coordinate differences for the same x and y dimensions are all approximate squares anywhere in the world, only side lengths of a region become shorter as the latitude increases, and for Mercator coordinates, in specific regions such as a latitude range in which China is located, changes on side lengths are acceptable, and have relatively small impact, so that an influence of a POI obtained through statistic collection based on the Mercator coordinates has higher accuracy.

A size for dividing the electronic map is selected based on the Mercator coordinates. If the size is excessively large, granularity of evaluation on a POI influence is excessively coarse. If the size is excessively small, big tests are faced by statistics of influences of off-line POIs, internal memory resources of on-line LBSs, and statistical sparsity. A selection of a unit of 200×200 is an appropriate selection by considering the two aspects comprehensively, that is, a size of a target region may be in a unit of 200×200. Optionally, the network device may dynamically adjust the size of the region based on a total quantity of POIs in the region, and for example, for a region with dense POIs, reduce a size of the region, and for a region with sparse POIs, increase a size of the region. In one implementation, a unit may be a meter.

For a global service, a size of a region whose geographic location range is in a high latitude region may be corrected, to ensure that a region area of a high latitude region and a region area of a low latitude region are approximately the same.

The target POI is at least one POI selected according to an influence or a popularity. For example, there are 100 POIs affecting the target region, and the network device may select at least one POI from the 100 POIs as the target POI according to influences of the 100 POIs on the target region.

The influence of a POI may be used for representing a capability of the POI to make impact, and a greater influence indicates greater impact. The influence may include at least one of the following influences: a target-region influence, a smooth-window-region influence, or a fused-region influence. The target-region influence may be a regional influence on a target region. The smooth-window-region influence may be a regional influence on a smoothing window of multiple regions. The fused-region influence may be a regional influence on multiple regions fused together.

The target-region influence may refer to an influence generated by a POI on the target region, which is obtained by dividing the electronic map based on the Mercator coordinates. For example, a regional influence generated by a POI on the target region is determined and obtained according to a first quantity of check-ins and a first quantity of presentations of the POI in the target region.

The smooth-window-region influence may refer to a regional influence generated by the POI on a smoothing window. For example, the regional influence generated by the POI on the smoothing window is determined and obtained according to a second quantity of check-ins and a second quantity of presentations of the POI in the smoothing window. The second quantity of check-ins of the POI in the smoothing window is obtained by performing weighted summation on quantities of check-ins of a first POI in regions overlapping with the smoothing window, and the second quantity of presentations of the POI in the smoothing window is obtained by performing weighted summation on quantities of presentations of the first POI in the regions overlapping with the smoothing window. The first POI is any POI in the target region.

The fused-region influence may refer to an influence obtained by fusing a regional influence generated by the POI on the target region and a regional influence generated by the POI on at least one region adjacent to the target region. For example, the fused-region influence generated by the POI on the target region is determined and obtained according to a third quantity of check-ins and a third quantity of presentations of the POI in the target region. The third quantity of check-ins of the POI in the target region is obtained by performing weighted summation on quantities of check-ins of the POI in regions in the fused region, and the third quantity of presentations of the POI in the target region is obtained by performing weighted summation on quantities of presentations of the POI in the regions in the fused region.

The quantity of check-ins may refer to a quantity of times that users click on a POI in a preset period of time detected by the network device. The quantity of presentations may refer to a quantity of times that by the network device presents a POI to users in a preset period of time.

In a conventional POI recommendation method for location-based services, the electronic map is not divided into regions, and a factor that a same POI has different influences on different regions is not considered, resulting in relatively low accuracy of the influence of the POI obtained through statistic collection. According to the embodiments of this application, a target region is determined according to a geographic location range obtained by dividing an electronic map based on Mercator coordinates, an influence of a POI affecting the target region is obtained, and the influence of the POI obtained through statistic collection based on the Mercator coordinates is more accurate, so that quality of service of the LBS is improved.

The network device may be a user terminal or a server. The user terminal may include a personal computer, a smartphone (such as an Android mobile phone or an iOS mobile phone), an in-vehicle device, a wearable device, or the like, and is not limited by the embodiments of this application specifically.

Figure 2:
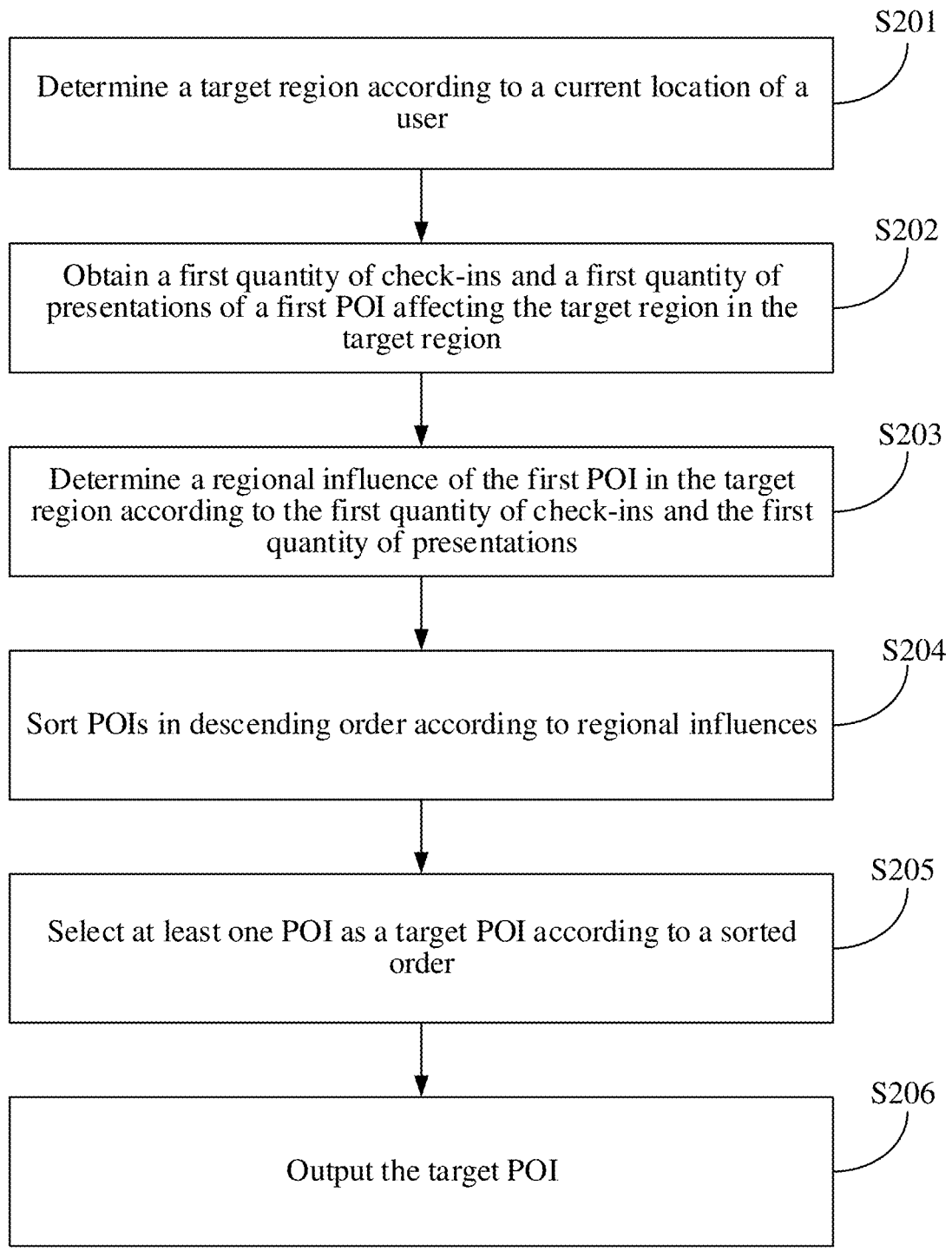
FIG. 2 is a schematic flowchart of a POI recommendation method for location-based services according to an embodiment of this application.

FIG. 2 is a schematic flowchart of a POI recommendation method for location-based services according to an embodiment of this application. As shown in FIG. 2, the POI recommendation method for location-based services may include at least the following steps.

S201. Determine a target region according to a current location of a user.

A network device may determine the target region according to the current location of the user. Specifically, the network device may obtain the current location of the user, and determines the target region according to the current location of the user.

In a feasible embodiment, a manner in which the network device determines the target region according to the current location of the user may be specifically: determining a region corresponding to a geographic location range in which the user is located as the target region. For example, if an electronic map is not divided by the network device, before determining the region corresponding to the geographic location range in which the location of user is located as the target region, the network device may obtain at least two regions by dividing the electronic map based on Mercator coordinates, and obtain a geographic location range corresponding to each region.

Figure 1B:
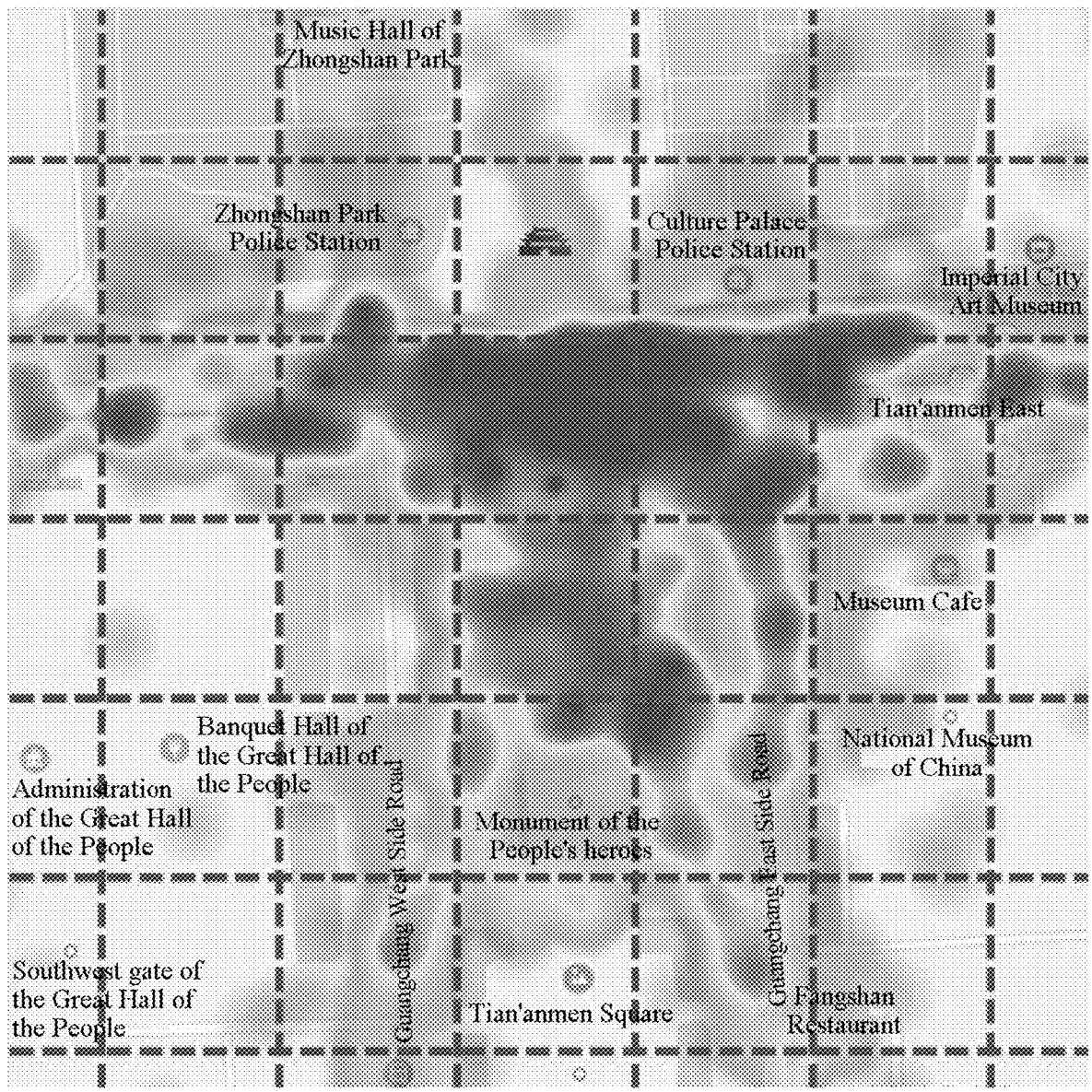
FIG. 1B is a schematic diagram of an interface of an electronic map according to an embodiment of this application.

Using the schematic diagram of an interface of an electronic map shown in FIG. 1B as an example, when a current location of the user is the banquet hall of the Great Hall of the People, the network device may determine that the target region is a region including an icon of "the banquet hall of the Great Hall of the People" in the electronic map.

S202. Obtain a first quantity of check-ins and a first quantity of presentations of a first POI affecting the target region in the target region.

Specifically, after determining the target region according to the current location of the user, the network device may obtain the first quantity of check-ins and the first quantity of presentations of the first POI affecting the target region in the target region, the first POI being any POI in the target region.

In a feasible embodiment, the first quantity of check-ins may include a quantity of check-ins per unit of time, a total quantity of check-ins in a preset cycle, or a sum of quantities of check-ins ever obtained through statistic collection (for example, a sum of quantities of check-ins obtained through statistic collection in a period of time starting from obtaining a quantity of check-ins through the first statistic collection to obtaining a quantity of check-ins through the latest statistic collection). The first quantity of presentations includes a quantity of presentations per unit of time, a total quantity of presentations in a preset cycle, or a sum of quantities of presentations ever obtained through statistic collection. For example, if the unit of time is one day, the first quantity of check-ins may be a quantity of check-ins obtained through statistic collection in one day, and the first quantity of presentations may be a quantity of presentations obtained through statistic collection in one day. For another example, if the preset cycle includes seven units of time, and a unit of time is one day, then the first quantity of check-ins may be a quantity of check-ins obtained through statistic collection in a week, and the first quantity of presentations may be a quantity of presentations obtained through statistic collection in a week.

In this technical solution, a short-term popular POI is considered, and the network device may obtain a total quantity of check-ins and a total quantity of presentations of the POI in a preset cycle in a target region, and determine a regional influence of the POI in the target region according to the total quantity of check-ins and the total quantity of presentations in the preset cycle. Popularity changes of the POI in a specific period of time may be used as an evaluation standard of influences of the POI under different timeliness.

S203. Determine a regional influence of the first POI on the target region according to the first quantity of check-ins and the first quantity of presentations.

Specifically, the network device may use the first quantity of check-ins and the first quantity of presentations of the first POI in the target region as evaluation standards of the regional influence of the first POI in the target region. An influence of a POI may be positively correlated to a quantity of check-ins of the POI, and an influence of a POI may be positively correlated to a quantity of presentations of the POI.

In a feasible embodiment, after obtaining the first quantity of check-ins and the first quantity of presentations of the first POI in the target region, the network device may obtain a first click-through rate of the first POI in the target region by dividing the first quantity of check-ins by the first quantity of presentations, and determine a regional influence of the first POI in the target region according to the first quantity of check-ins and the first click-through rate of the first POI in the target region. When the first quantity of presentations of the first POI in the target region is 0, the network device may determine that the first click-through rate of the first POI in the target region is 0.

For example, the network device may obtain a regional influence of the first POI by dividing the first quantity of check-ins of the first POI in the target region by a first quantity of check-ins of all POIs affecting the target region in the target region. For example, the network device may obtain first quantities of presentations of all POIs affecting the target region in the target region, and select a maximum value from the obtained first quantities of presentations, to evaluate a visit popularity of the first POI based on the selected maximum value.

S204. Sort POIs in descending order according to target-region influences.

Specifically, after determining the target-region influences of the POIs affecting the target region by performing step S202 and S203, the network device may use the regional influences as a reference to sort the POIs, for example, to sort the POIs in descending order according to the target-region influences. Optionally, the network device may alternatively sort the POIs in ascending order according to the regional influences.

S205. Select at least one POI as a target POI according to a sorted order.

After sorting the POIs in descending order according to the regional influences, the network device may select at least one POI as the target POI according to the sorted order. For example, there are 100 POIs affecting the target region, and the network device may select 10 POIs with relatively high regional influences from the 100 POIs, where regional influences of the selected 10 POIs are higher than regional influences of POIs other than the 10 POIs in the 100 POIs.

S206. Output the target POI.

After determining the target POI, the network device may output the target POI. For example, if the target POI includes a POI 1 to a POI 10, the POI 1 to the POI 3 are located in a region that is adjacent to the target region and that is on the left to the target region, and the POI 4 to the POI 10 are located in the target region, then the network device may display the POI 4 to the POI 10 in the target region, and display the POI 1 to the POI 3 in the region that is adjacent to the target region and that is on the left to the target region.

In this embodiment of this application, a target region is determined according to a current location of a user, a first quantity of check-ins and a first quantity of presentations of a first POI affecting a target region in the target region are obtained, a regional influence of the first POI in the target region is determined according to the first quantity of check-ins and the first quantity of presentations, POIs are sorted in descending order according to influences, at least one POI is selected as a target POI according to a sorted order, and the target POI is outputted, so that an influence of a POI can be evaluated accurately, and quality of service of an LBS is improved.

Figure 3:
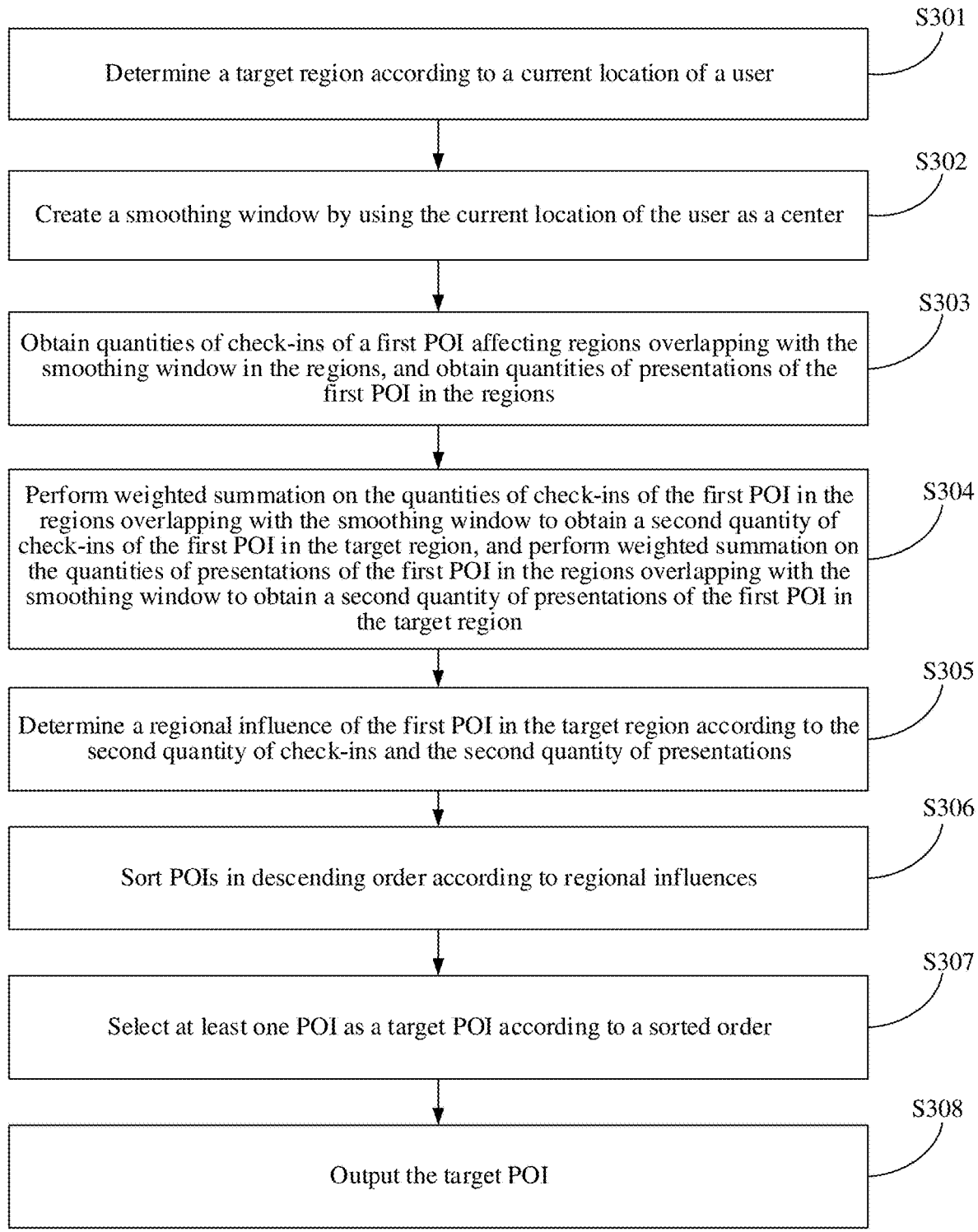
FIG. 3 is a schematic flowchart of a POI recommendation method for location-based services according to another embodiment of this application.

FIG. 3 is a schematic flowchart of a POI recommendation method for location-based services according to another embodiment of this application. As shown in FIG. 3, the POI recommendation method for location-based services may include at least the following steps.

S301. Determine a target region according to a current location of a user.

For step S301 in this embodiment of this application, reference may be made to the detailed descriptions of step S201 in the foregoing embodiment, and details are not described again in this embodiment of this application.

S302. Create a smoothing window by using the current location of the user as a center.

A network device may create a smoothing window by using the current location of the user as a center in an electronic map, the smoothing window overlapping with any one or more of at least two regions. Optionally, the smoothing window may be a square window. Further, side lengths of the smoothing window may be equal to side lengths of any region in the at least two regions, and the smoothing window may overlap with four regions at most. Using a schematic diagram of an interface of an electronic map shown in FIG. 4 as an example, distances between the current location of the user and each side of the smoothing window are equal, a region corresponding to a geographic location range in which the current location of the user is located is the target region, and the smoothing window overlaps with a first region S1, a second region S2, a third region S3, and a target region S4 respectively.

S303. Obtain quantities of check-ins of a first POI affecting regions overlapping with the smoothing window in the regions, and obtain quantities of presentations of the first POI affecting regions overlapping with the smoothing window in the regions.

Specifically, the network device may obtain quantities of check-ins of the first POI affecting the regions overlapping with the smoothing window in the regions overlapping with the smoothing window, and obtain quantities of presentations of the first POI affecting the regions overlapping with the smoothing window in the regions overlapping with the smoothing window. The first POI is any POI affecting the regions overlapping with the smoothing window. Using FIG. 4 as an example, the network device may obtain quantities of check-ins of the first POI in the first region, the second region, the third region, and the target region, and the network device may further obtain quantities of presentations of the first POI in the first region, the second region, the third region, and the target region. For example, the first POI affecting the regions overlapping with the smoothing window may be any POI in the regions overlapping with the smoothing window.

S304. Perform weighted summation on the quantities of check-ins of the first POI in the regions overlapping with the smoothing window to obtain a second quantity of check-ins of the first POI in the target region, and perform weighted summation on the quantities of presentations of the first POI in the regions overlapping with the smoothing window to obtain a second quantity of presentations of the first POI in the target region.

Figure 4:
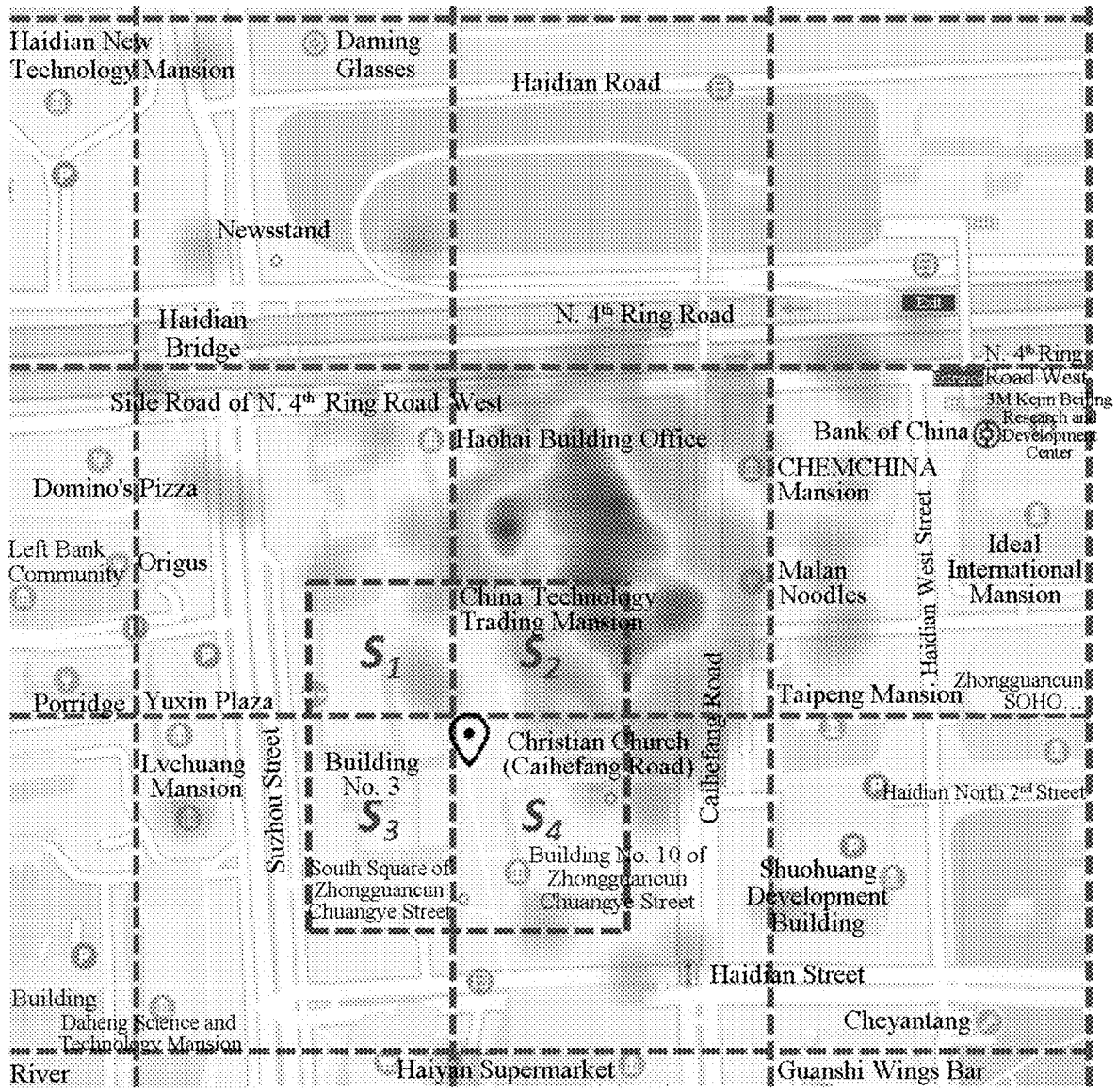
FIG. 4 is a schematic diagram of an interface of an electronic map according to another embodiment of this application.

Using FIG. 4 as an example, the network device may perform weighted summation on the quantities of check-ins of the first POI in the first region, the second region, the third region, and the target region to obtain the second quantity of check-ins of the first POI in the target region. The network device may further perform weighted summation on the quantities of presentations of the first POI in the first region, the second region, the third region, and the target region to obtain the second quantity of presentations of the first POI in the target region.

In a feasible embodiment, the second quantity of check-ins may include a quantity of check-ins per unit of time, a total quantity of check-ins in a preset cycle, or a sum of quantities of check-ins ever obtained through statistic collection. The second quantity of presentations may include a quantity of presentations per unit of time, a total quantity of presentations in a preset cycle, or a sum of quantities of presentations ever obtained through statistic collection. For example, if the unit of time is one day, the second quantity of check-ins may be a quantity of check-ins obtained through statistic collection in one day, and the second quantity of presentations may be a quantity of presentations obtained through statistic collection in one day. For another example, if the preset cycle includes seven units of time, and a unit of time is one day, then the second quantity of check-ins may be a quantity of check-ins obtained through statistic collection in a week, and the second quantity of presentations may be a quantity of presentations obtained through statistic collection in a week.

In this technical solution, a short-term popular POI is considered, and the network device may obtain a total quantity of check-ins and a total quantity of presentations of the POI in a preset cycle in a target region, and determine a regional influence of the POI in the target region according to the total quantity of check-ins and the total quantity of presentations in the preset cycle. Popularity changes of the POI in a specific period of time may be used as an evaluation standard of influences of the POI under different timeliness.

In a feasible embodiment, a weight of a quantity of check-ins or a quantity of presentations of the first POI in a first region overlapping with the smoothing window may be: a ratio of an area of an overlap region between the first region and the smoothing window to a total area of the smoothing window, the first region being any region overlapping with the smoothing window.

For example, the network device may obtain the second quantity of check-ins of the first POI in the target region through the following formula:

$$C = \frac{\sum_{i=1}^{n} S_i C_i}{\sum_{i=1}^{n} S_i}$$

C represents the second quantity of check-ins of the first POI in the target region, $S_i$ represents an area of an overlap region between the $i^{th}$ region and the smoothing window, represents a quantity of check-ins of the first POI in the $i^{th}$ region, and n represents a quantity of regions overlapping with the smoothing window. Using FIG. 4 as an example, if the regions overlapping with the smoothing window include the first region, the second region, the third region, and the target region, and n=4, and the network device may use the first region as the first region, the second region as the second region, the third region as the third region, and the target region as the fourth region.

The second quantity of presentations of the first POI in the target region may be obtained through similar calculation, and details are not described again in this embodiment of this application.

S305. Determine a regional influence of the first POI in the target region according to the second quantity of check-ins and the second quantity of presentations.

Specifically, the network device may use the second quantity of check-ins and the second quantity of presentations of the first POI in the target region as evaluation standards of the regional influence of the first POI in the target region.

In a feasible embodiment, after obtaining the second quantity of check-ins and the second quantity of presentations of the first POI in the target region, the network device may obtain a second click-through rate of the first POI in the target region by dividing the second quantity of check-ins by the second quantity of presentations, and determine a regional influence of the first POI in the target region according to the second quantity of check-ins and the second click-through rate of the first POI in the target region. When the second quantity of presentations of the first POI in the target region is 0, the network device may determine that the second click-through rate of the first POI in the target region is 0.

For example, the network device may obtain a regional influence of the first POI by dividing the second quantity of check-ins of the first POI in the target region by a second quantity of check-ins of all POIs affecting regions overlapping with the smoothing window in the target region. For example, the network device may obtain second quantities of presentations of all the POIs affecting the regions overlapping with the smoothing window in the target region, and select a maximum value from the obtained second quantities of presentations, to evaluate a visit popularity of the first POI based on the selected maximum value.

S306. Sort POIs in descending order according to regional influences.

Specifically, after determining the regional influences of the POIs affecting the regions overlapping with the smoothing window by performing step S303 and S305, the network device may use the regional influences as a reference to sort the POIs, for example, to sort the POIs in descending order according to the regional influences. Optionally, the network device may alternatively sort the POIs in ascending order according to the regional influences.

S307. Select at least one POI as a target POI according to a sorted order.

After sorting the POIs in descending order according to the regional influences, the network device may select at least one POI as the target POI according to the sorted order. For example, there are 100 POIs affecting the region overlapping with the smoothing window, and the network device may select 10 POIs with relatively high regional influences from the 100 POIs, where regional influences of the selected 10 POIs are higher than regional influences of POIs other than the 10 POIs in the 100 POIs.

S308. Output the target POI.

After determining the target POI, the network device may output the target POI. For example, if the target POI includes a POI 1 to a POI 10, the POI 1 to the POI 3 are located in a region that is adjacent to the target region and that is on the left to the target region, and the POI 4 to the POI 10 are located in the target region, then the network device may display the POI 4 to the POI 10 in the target region, and display the POI 1 to the POI 3 in the region that is adjacent to the target region and that is on the left to the target region.

In this embodiment of this application, a target region is determined according to a current location of a user, a smoothing window is created by using the current location of the user as a center, quantities of check-ins of a first POI affecting regions overlapping with the smoothing window in the regions overlapping with the smoothing window are obtained, and quantities of presentations of the first POI affecting the regions overlapping with the smoothing window in the regions overlapping with the smoothing window are obtained, weighted summation is performed on the quantities of check-ins of the first POI in the regions overlapping with the smoothing window to obtain a second quantity of check-ins of the first POI in the target region, and weighted summation is performed on quantities of presentations of the first POI in the regions overlapping with the smoothing window to obtain a second quantity of presentations of the first POI in the target region, a regional influence of the first POI in the target region is determined according to the second quantity of check-ins and the second quantity of presentations, POIs are sorted in descending order according to influences, at least one POI is selected as a target POI according to a sorted order, and the target POI is outputted, so that inaccuracy caused by the regional influence may be compensated for, and quality of service of an LBS is improved. Compared with the POI recommendation method for location-based services shown in FIG. 2, this embodiment of this application can effectively alleviate a step problem that is likely to be caused by a regional influence in a region boundary, and improve accuracy of evaluating a regional influence of a POI.

Figure 5:
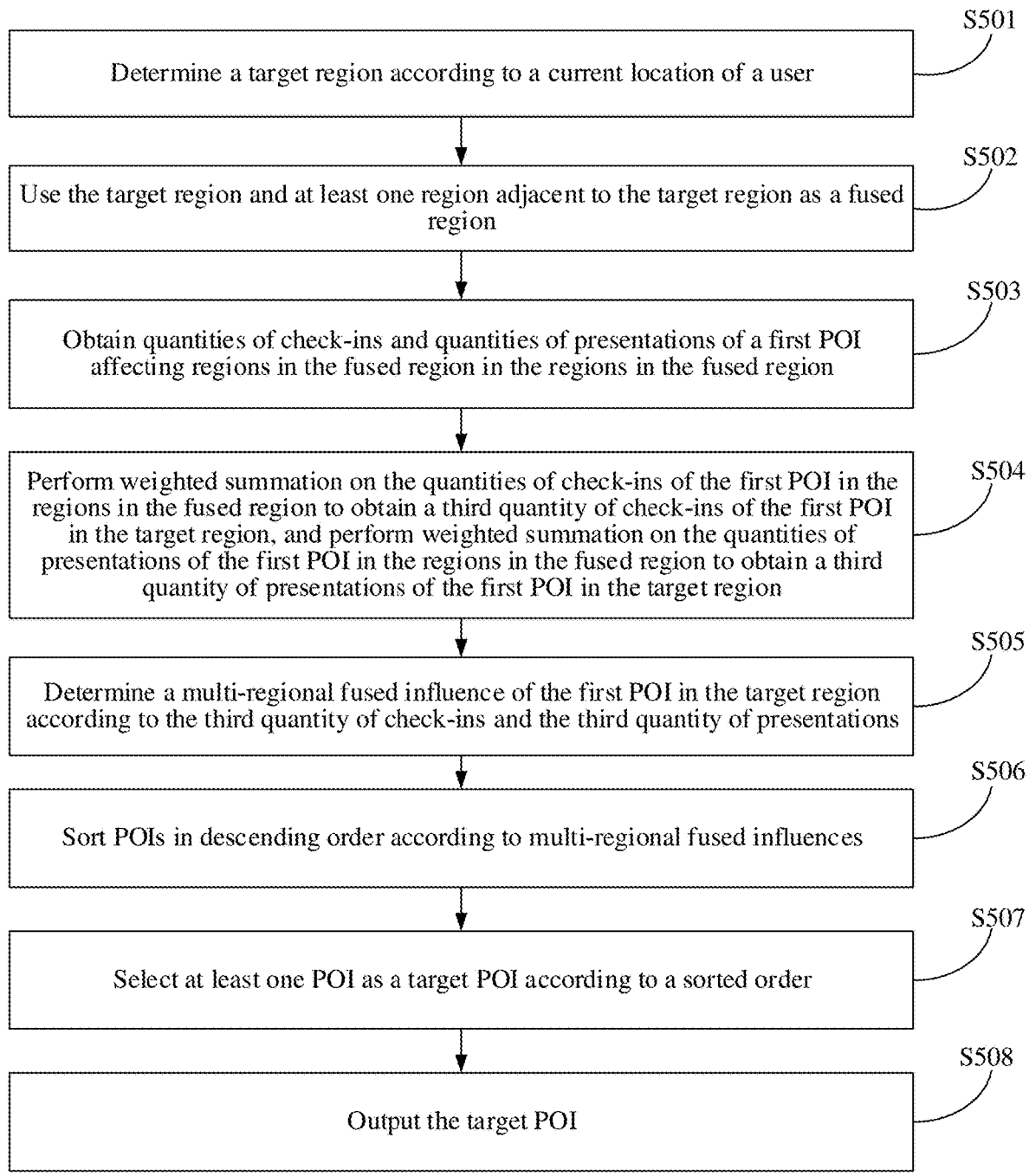
FIG. 5 is a schematic flowchart of a POI recommendation method for location-based services according to another embodiment of this application.

FIG. 5 is a schematic flowchart of a POI recommendation method for location-based services according to another embodiment of this application. As shown in FIG. 5, the POI recommendation method for location-based services may include at least the following steps.

S501. Determine a target region according to a current location of a user.

For step S501 in this embodiment of this application, reference may be made to the detailed descriptions of step S201 in the foregoing embodiment, and details are not described again in this embodiment of this application.

S502. Use the target region and at least one region adjacent to the target region as a fused region.

The network device may use the target region and at least one region adjacent to the target region as the fused region. In one implementation using FIG. 6 as an example, if the user is located in a region d5, the network device may use the region d5 at which the user is located as a target region. There are eight regions (d1, d2, d3, d4, d6, d7, d8, and d9) adjacent to the target region d5, the network device may use the target region and the eight regions adjacent to the target region as the fused region.

In another implementation, for example, if the user is located in an overlap boundary between two regions (d4 and d5), the network device may use one of the two regions as the target region (e.g, d5). If there are five regions (d1, d2, d4, d7, and d8) adjacent to the target region, the network device may use the target region and the five regions adjacent to the target region as the fused region. For example, regarding the two regions (d4 and d5), two regions (d1 and d2) that are adjacent to the foregoing two regions and located above the two regions, and two regions (d7 and d8) that are adjacent to the foregoing two regions and located below the foregoing two regions.

In another implementation, for example, if the user is located at an overlap point of four regions (d2, d3, d5, and d6), the network device may use one of the four regions as the target region (d5), and there are three regions (d2, d3, and d6) adjacent to the target region. The network device may use the foregoing four regions as the fused region.

S503. Obtain quantities of check-ins and quantities of presentations of a first POI affecting regions in the fused region in the regions in the fused region.

Figure 6:
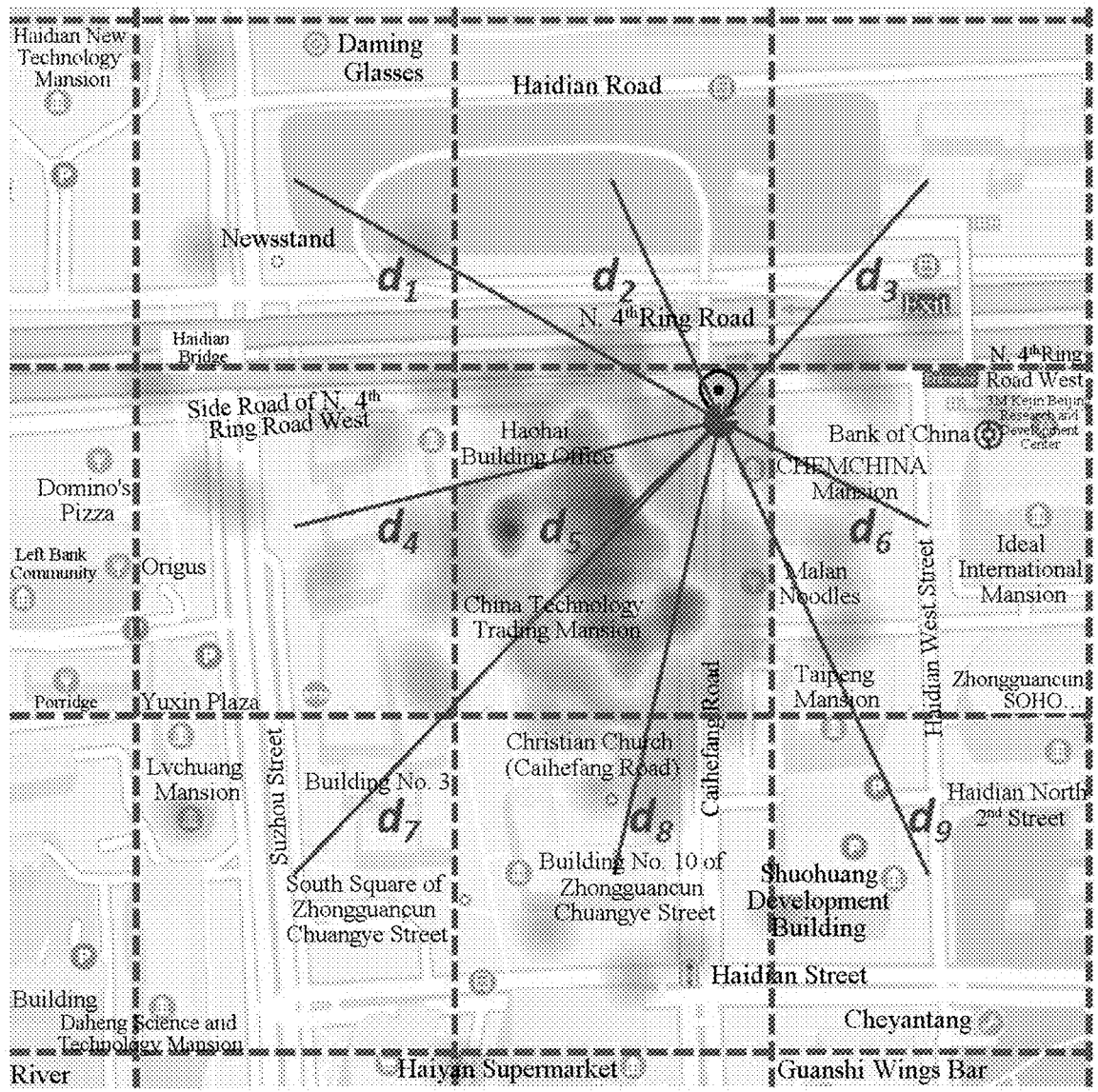
FIG. 6 is a schematic diagram of an interface of an electronic map according to another embodiment of this application.

Using FIG. 6 as an example, the network device may obtain a quantity of check-ins and a quantity of presentations of the first POI in the target region, and the network device may further obtain quantities of check-ins and quantities of presentations of the first POI in the first region to the eighth region that are adjacent to the target region. The first POI is any POI affecting regions in the fused region. For example, the first POI affecting the regions in the fused region may be any POI in the fused region.

S504. Perform weighted summation on the quantities of check-ins of the first POI in the regions in the fused region to obtain a third quantity of check-ins of the first POI in the target region, and perform weighted summation on the quantities of presentations of the first POI in the regions in the fused region to obtain a third quantity of presentations of the first POI in the target region.

Using FIG. 6 as an example, the network device may perform weighted summation on the quantities of check-ins of the first POI in the target region and eight regions adjacent to the target region, to obtain the third quantity of check-ins of the first POI in the target region. The network device may further perform weighted summation on the quantities of presentations of the first POI in the target region and eight regions adjacent to the target region, to obtain the third quantity of presentations of the first POI in the target region.

In a feasible embodiment, the third quantity of check-ins may include a quantity of check-ins per unit of time, a total quantity of check-ins in a preset cycle, or a sum of quantities of check-ins ever obtained through statistic collection. The third quantity of presentations may include a quantity of presentations per unit of time, a total quantity of presentations in a preset cycle, or a sum of quantities of presentations ever obtained through statistic collection. For example, the unit of time is one day, the third quantity of check-ins may be a quantity of check-ins obtained through statistic collection in one day, and the third quantity of presentations may be a quantity of presentations obtained through statistic collection in one day. For another example, the preset cycle includes seven units of time, and a unit of time is one day, then the third quantity of check-ins may be a quantity of check-ins obtained through statistic collection in a week, and the third quantity of presentations may be a quantity of presentations obtained through statistic collection in a week.

In this technical solution, a short-term popular POI is considered, and the network device may obtain a total quantity of check-ins and a total quantity of presentations of the POI in a preset cycle in a target region, and determine a regional influence of the POI in the target region according to the total quantity of check-ins and the total quantity of presentations in the preset cycle. Popularity changes of the POI in a specific period of time may be used as an evaluation standard of influences of the POI under different timeliness.

In a feasible embodiment, a step of obtaining a weight of a quantity of check-ins or a quantity of presentations of the first POI in a second region in the fused region may include: obtaining a preset distance value and a spacing distance value between a center point of the second region and the current location of the user, the second region being any region in the fused region; selecting a greater one of the preset distance value and the spacing distance value; and determining a ratio of the preset distance value to the greater one as the weight of the quantity of check-ins or the quantity of presentations of the first POI in the second region.

For example, the network device may obtain the third quantity of check-ins of the first POI in the target region through the following formula:

$$C = \sum_{i=1}^{n} \frac{100 C_i}{\max(100, d_i)}$$

C represents the third quantity of check-ins of the first POI in the target region, $C_i$ represents a quantity of check-ins of the first POI in the $i^{th}$ region, $d_i$ represents a spacing distance value between a center point of the $i^{th}$ region and a current location of the user, n represents a quantity of regions in the fused region, and the preset distance value is 100.

For example, the network device may obtain the third quantity of check-ins of the first POI in the target region through the following formula:

$$C = \sum_{i=1}^{n} \frac{100 \cos\theta * C_i}{\max(100\cos\theta, d_i)}$$

C represents the third quantity of check-ins of the first POI in the target region, $C_i$ represents a quantity of check-ins of the first POI in the $i^{th}$ region, $d_i$ represents a spacing distance value between a center point of the $i^{th}$ region and a current location of the user, n represents a quantity of regions in the fused region, the preset distance value is 100 cos θ, and θ represents a latitude of the first POI.

Using FIG. 6 as an example, if the fused region includes the target region and eight regions adjacent to the target region, n=9, and the network device may use a region that is adjacent to the target region and that is located at the top left to the target region as the first region, a region that is adjacent to the target region and that is located above the target region as the second region, a region that is adjacent to the target region and that is located at the top right to the target region as the third region, a region that is adjacent to the target region and that is located on the left to the target region as the fourth region, the target region as the fifth region, a region that is adjacent to the target region and that is located on the right to the target region as the sixth region, a region that is adjacent to the target region and that is located at the bottom left to the target region as the seventh region, a region that is adjacent to the target region and that is located below the target region as the eighth region, and a region that is adjacent to the target region and that is located at the bottom right to the target region as the ninth region.

The third quantity of presentations of the first POI in the target region may be obtained through similar calculation, and details are not described again in this embodiment of this application.

S505. Determine a fused-region influence of the first POI in the target region according to the third quantity of check-ins and the third quantity of presentations.

Specifically, the network device may use the third quantity of check-ins and the third quantity of presentations of the first POI in the target region as evaluation standards of the fused-region influence of the first POI in the target region.

In a feasible embodiment, after obtaining the third quantity of check-ins and the third quantity of presentations of the first POI in the target region, the network device may obtain a third click-through rate of the first POI in the target region by dividing the third quantity of check-ins by the third quantity of presentations, and determine a fused-region influence of the first POI in the target region according to the third quantity of check-ins and the third click-through rate of the first POI in the target region. When the third quantity of presentations of the first POI in the target region is 0, the network device may determine that the third click-through rate of the first POI in the target region is 0.

For example, the network device may obtain a regional influence of the first POI by dividing the third quantity of check-ins of the first POI in the target region by a third quantity of check-ins of all POIs affecting the regions in the fused region in the target region. For example, the network device may obtain the third quantities of presentations of all the POIs affecting the regions in the fused region in the regions in the fused region, and select a maximum value from the obtained third quantities of presentations, to evaluate a visit popularity of the first POI based on the selected maximum value.

S506. Sort POIs in descending order according to fused-region influences.

Specifically, after determining the regional influences of the POIs affecting the regions in the fused region by performing step S502 to S505, the network device may use the regional influences as a reference to sort the POIs, for example, to sort the POIs in descending order according to the regional influences. Optionally, the network device may alternatively sort the POIs in ascending order according to the regional influences.

S507. Select at least one POI as a target POI according to a sorted order.

After sorting the POIs in descending order according to the regional influences, the network device may select at least one POI as the target POI according to the sorted order. For example, there are 100 POIs affecting the regions in the fused region, and the network device may select 10 POIs with relatively high regional influences from the 100 POIs, where regional influences of the selected 10 POIs are higher than regional influences of POIs other than the 10 POIs in the 100 POIs.

S508. Output the target POI.

After determining the target POI, the network device may output the target POI. For example, if the target POI includes a POI 1 to a POI 10, the POI 1 to the POI 3 are located in a region that is adjacent to the target region and that is on the left to the target region, and the POI 4 to the POI 10 are located in the target region, then the network device may display the POI 4 to the POI 10 in the target region, and display the POI 1 to the POI 3 in the region that is adjacent to the target region and that is on the left to the target region.

In this embodiment of this application, a target region is determined according to a current location of a user, quantities of check-ins and quantities of presentations of a first POI affecting regions in a fused region in the regions in the fused region are obtained, weighted summation is performed on the quantities of check-ins of the first POI in the regions in the fused region to obtain a third quantity of check-ins of the first POI in a target region, and weighted summation is performed on the quantity of presentations of the first POI in the regions in the fused region to obtain a third quantity of presentations of the first POI in the target region, a fused-region influence of the first POI in the target region is determined according to the third quantity of check-ins and the third quantity of presentations, POIs are sorted in descending order according to the fused-region influences, at least one POI is selected as a target POI according to a sorted order, and the target POI is outputted, so that an influence of a POI can be evaluated accurately, and quality of service of an LBS is improved. Compared with the POI recommendation method for location-based services shown in FIG. 2, this embodiment of this application can effectively alleviate a step problem that is likely to be caused by a regional influence in a region boundary, and improve accuracy of evaluating a regional influence of a POI.

In a POI recommendation method for location-based services disclosed in another embodiment of this application, the network device may determine a target region according to a current location of a user, obtain a target-region influence of a first POI in the target region with reference to FIG. 2, obtain a regional influence of the first POI on a smoothing window in the target region with reference to FIG. 3, sort POIs in descending order according to the target-region influences and the smooth-window-region influences, select at least one POI as a target POI according to a sorted order, and output the target POI, so that an influence of a POI may be evaluated accurately, and quality of service of an LBS is improved.

In a POI recommendation method for location-based services disclosed in another embodiment of this application, the network device may determine a target region according to a current location of a user, obtain a target-region influence of a first POI in the target region with reference to FIG. 2, obtain a fused-region influence of the first POI in the target region with reference to FIG. 5, sort POIs in descending order according to the target-region influences and the fused-region influences, select at least one POI as a target POI according to a sorted order, and output the target POI, so that an influence of a POI may be evaluated accurately, and quality of service of an LBS is improved.

In a POI recommendation method for location-based services disclosed in another embodiment of this application, the network device may determine a target region according to a current location of a user, obtain smooth-window-region influence of the first POI in the target region with reference to FIG. 3, obtain a fused-region influence of the first POI in the target region with reference to FIG. 5, sort POIs in descending order according to the smooth-window-region influences and the fused-region influences, select at least one POI as a target POI according to a sorted order, and output the target POI, so that an influence of a POI may be evaluated accurately, and quality of service of an LBS is improved.

In a POI recommendation method for location-based services disclosed in another embodiment of this application, the network device may determine a target region according to a current location of a user, obtain a regional influence of a first POI in the target region with reference to FIG. 2, obtain a regional influence of the first POI on a smoothing window in the target region with reference to FIG. 3, obtain a fused-region influence of the first POI in the target region with reference to FIG. 5, sort POIs in descending order according to the target-region influences, the smooth-window-region influences, and the fused-region influences, select at least one POI as a target POI according to a sorted order, and output the target POI, so that an influence of a POI may be evaluated accurately, and quality of service of an LBS is improved.

In a POI recommendation method for location-based services disclosed in another embodiment of this application, the obtaining a to-be-recommended target POI in a target region includes: obtaining influences of POIs affecting the target region, the influences including at least two influences selected from a group including a target-region influence, smooth-window-region influence, and a fused-region influence; determining comprehensive influences of the POIs according to at least two influences corresponding to the POI, and selecting at least one POI as a target POI according to the comprehensive influences of the POIs.

The comprehensive influence refers to an influence obtained through a comprehensive calculation by using at least two regional influences. When selecting a POI according to the at least two regional influences selected from a group including the target-region influence, the smooth-window-region influence, and the fused-region influence, weight coefficients corresponding to the selected regional influences may be obtained, weighted summation is performed according to the regional influences and the corresponding weight coefficients to obtain a comprehensive influence, and at least one POI is selected as a target POI according to the comprehensive influence. For example, a POI with a sorted order higher than a preset value is selected as the target POI according to a sorted order of the comprehensive influences in descending order. Weights corresponding to regional influences may be set according to requirements or experience. For example, it can be learned of from experience that when a weight corresponding to the target-region influence is 0.5, a weight corresponding to the smooth-window-region influence is 0.3, and a weight corresponding to the fused-region influence is 0.2, the selected POI has high accuracy, and when the target-region influence is a, the smooth-window-region influence is b, and the fused-region influence is c, the comprehensive regional influence may be 0.5*a+0.3*b+0.2*c.

Through the POI recommendation method for location-based services disclosed in the embodiments of this application, an effect of a surrounding recommendation service of an LBS may be optimized. For example, in a check-in location recommendation list service of Moment of WeChat, a click-through rate of a POI may be improved from 68% to 78%.

The steps in the embodiments of this application are not necessarily performed sequentially in the order indicated by the step labels. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

In an embodiment, a network device is further provided. The network device includes a POI recommendation apparatus for location-based services, the POI recommendation apparatus for location-based services including modules. Each module may be entirely or partially implemented by software, hardware, or a combination thereof.

Figure 7:
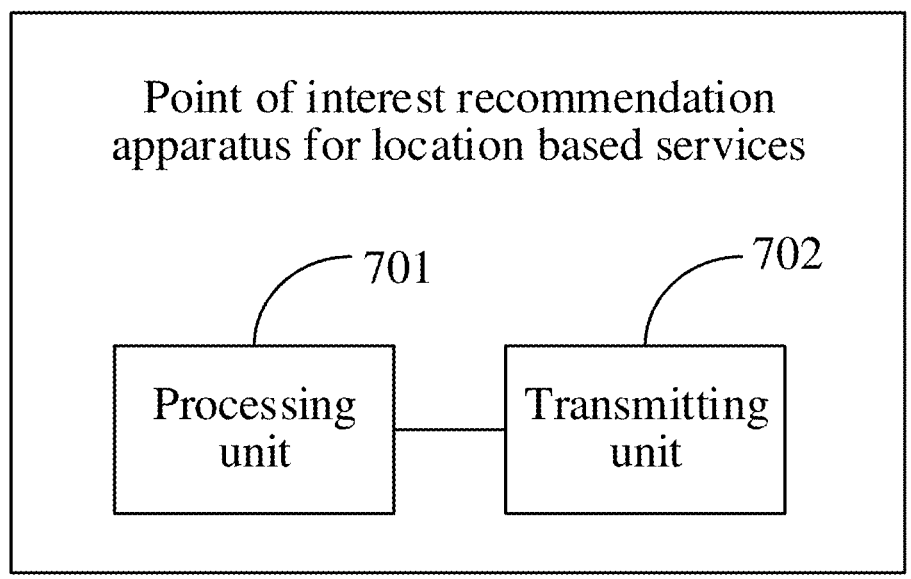
FIG. 7 is a schematic structural diagram of a POI recommendation apparatus for location-based services according to an embodiment of this application.

FIG. 7 is a schematic structural diagram of a POI recommendation apparatus for location-based services according to an embodiment of this application. As shown in the figure, the POI recommendation apparatus for location-based services in this embodiment of this application may include at least a processing unit 701 and a transmitting unit 702.

The processing unit 701 is configured to determine a target region according to a current location of a user, the target region being a geographic location range obtained by dividing an electronic map based on Mercator coordinates, the Mercator coordinates being coordinates obtained through a Mercator projection.

The processing unit 701 is further configured to obtain a to-be-recommended target POI in the target region, the target POI being at least one POI selected according to an influence, the influence including at least one of a regional influence, smooth-window-region influence, or a fused-region influence. In one implementation, the to-be-recommended target POI may be outside the target region.

The transmitting unit 702 is configured to output the target POI in the target region.

Optionally, that the processing unit 701 determines a target region according to a current location of a user includes:
obtaining at least two regions by dividing the electronic map based on the Mercator coordinates;
obtaining a geographic location range corresponding to each region; and
determining a region corresponding to a geographic location range in which the location of the user is located as a target region.

Optionally, that the processing unit 701 obtains a to-be-recommended target POI in the target region includes:
obtaining influences of POIs affecting the target region;
sorting the POIs in descending order according to the influences; and
selecting at least one POI as the target POI according to a sorted order.

Optionally, the influence includes the target-region influence;
That the processing unit 701 obtains influences of POIs affecting the target region includes:
obtaining a first quantity of check-ins and a first quantity of presentations of a first POI affecting the target region in the target region, the first POI being any POI affecting the target region; and determining a regional influence of the first POI in the target region according to the first quantity of check-ins and the first quantity of presentations.

Optionally, the influence includes the smooth-window-region influence.
That the processing unit 701 obtains influences of POIs affecting the target region includes:
creating a smoothing window by using the location of the user as a center, the smoothing window overlapping with any one or more of the at least two regions;
obtaining quantities of check-ins of a first POI affecting regions overlapping with the smoothing window in the regions overlapping with the smoothing window, and obtaining quantities of presentations of the first POI affecting the regions overlapping with the smoothing window in the regions overlapping with the smoothing window, the first POI being any POI affecting the regions overlapping with the smoothing window;
performing weighted summation on the quantities of check-ins of the first POI in the regions overlapping with the smoothing window to obtain a second quantity of check-ins of the first POI in the target region, and performing weighted summation on the quantities of presentations of the first POI in the regions overlapping with the smoothing window to obtain a second quantity of presentations of the first POI in the target region; and
determining a regional influence of the first POI in the target region according to the second quantity of check-ins and the second quantity of presentations.

Optionally, a weight of a quantity of check-ins or a quantity of presentations of the first POI in a first region overlapping with the smoothing window is a ratio of an area of an overlap region between the first region and the smoothing window to a total area of the smoothing window, the first region being any region overlapping with the smoothing window.

Optionally, side lengths of the smoothing window are correspondingly equal to side lengths of any region in the at least two regions.

Optionally, the influence includes the fused-region influence.
That the processing unit 701 obtains influences of POIs affecting the target region includes:
using the target region and at least one region adjacent to the target region as a fused region;
obtaining quantities of check-ins and quantities of presentations of a first POI affecting regions in the fused region in the regions in the fused region, the first POI being any POI affecting the regions in the fused region;
performing weighted summation on the quantities of check-ins of the first POI in the regions in the fused region to obtain a third quantity of check-ins of the first POI in the target region, and performing weighted summation on the quantities of presentations of the first POI in the regions in the fused region to obtain a third quantity of presentations of the first POI in the target region; and determining a fused-region influence of the first POI in the target region according to the third quantity of check-ins and the third quantity of presentations.

Optionally, a step of obtaining a weight of a quantity of check-ins or a quantity of presentations of the first POI in a second region in the fused region includes:

obtaining a preset distance value and a spacing distance value between a center point of the second region and the location of the user, the second region being any region in the fused region;

selecting a greater one of the preset distance value and the spacing distance value; and determining a ratio of the preset distance value to the greater one as the weight of the quantity of check-ins or the quantity of presentations of the first POI in the second region.

Optionally, the quantity of check-ins includes a quantity of check-ins per unit of time or a total quantity of check-ins in a preset cycle.

The quantity of presentations includes a quantity of presentations per unit of time or a total quantity of presentations in the preset cycle, the quantity of presentations being obtained according to a quantity of times the POI is presented in a preset period of time.

In this embodiment of this application, the processing unit 701 determines a target region according to a current location of a user, the target region being a geographic location range obtained by dividing an electronic map based on Mercator coordinates, and obtains a to-be-recommended target POI in the target region, the target POI being at least one POI selected according to an influence, the influence including at least one of a regional influence, a smooth-window-region influence, or a fused-region influence; and transmitting unit 702 outputs the target POI in the target region, so that an influence of a POI may be evaluated accurately, and quality of service of an LBS is improved.

Figure 8:
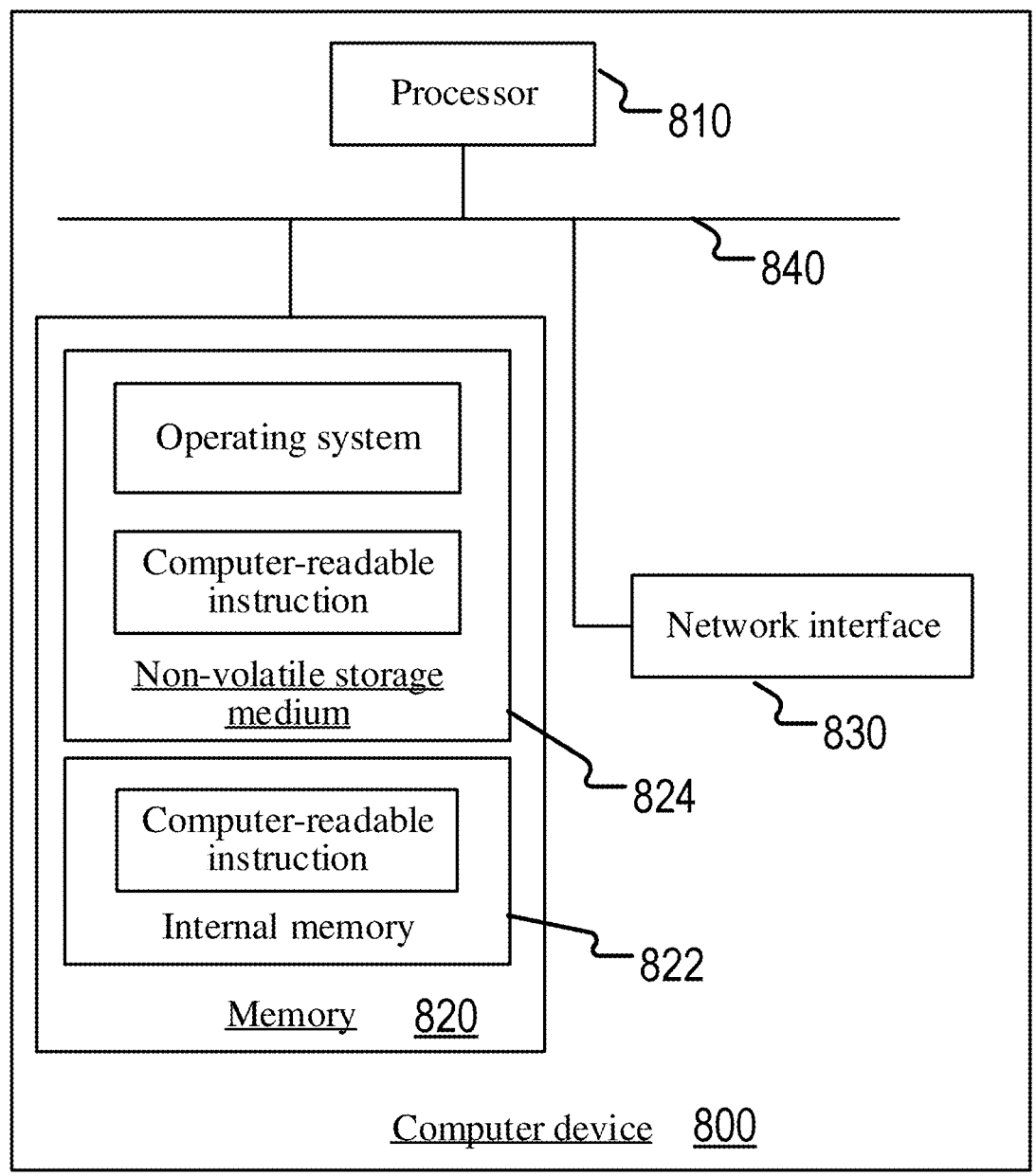
FIG. 8 is a schematic structural diagram of a network device according to an embodiment of this application.

FIG. 8 is a schematic structural diagram of a computer device 800 or a network device according to an embodiment of this application. The network device provided in this embodiment of this application may be configured to perform the method in the embodiment of this application shown in FIG. 2. For ease of description, only a part related to this embodiment of this application is provided. For undisclosed technical details, refer to the embodiment of this application shown in FIG. 2.

FIG. 8 shows an internal structure diagram of a network device in an embodiment. The network device may be specifically a server 120 in FIG. 1A. As shown in FIG. 8, the computer device includes a processor 810, a memory 820, and a network interface 830 that are connected by using a system bus 840. The memory includes a non-volatile storage medium 824 and an internal memory 822. The non-volatile storage medium of the computer device stores an operating system, and may further store a computer-readable instruction. The computer-readable instruction, when executed by the processor, may cause the processor to implement a POI recommendation method for location-based services. The internal memory may also store a computer-readable instruction. The computer-readable instruction, when executed by the processor, may cause the processor to implement the POI recommendation method for location-based services.

A person skilled in the art may understand that, the structure shown in FIG. 8 is only a block diagram of a partial structure related to the solution of this application, and does not constitute a limitation to the computer device to which the solution of this application is applied. Specifically, the computer device may include more or fewer components than those shown in the figure, or some components may be combined, or a different component deployment may be used.

In an embodiment, a POI recommendation apparatus for location-based services provided in this application may be implemented in a form of a computer-readable instruction, and the computer-readable instruction may be run on the computer device shown in FIG. 8. A memory of the computer device may store program modules constituting the POI recommendation apparatus for location-based services, for example, a processing unit 701 and a transmitting unit 702 shown in FIG. 7. A computer-readable instruction formed by the program modules causes the processor to perform the steps in the POI recommendation method for location-based services in the embodiments of this application described in this specification.

Specifically, the network device described in this embodiment of this application may be configured to perform some or all of the procedures of the method embodiments in this application described with reference to FIG. 2.

A person of ordinary skill in the art may understand that all or some of the processes in the method of the foregoing embodiments may be implemented and completed by using the computer programs to instruct related hardware. The programs may be stored in a non-volatile computer-readable storage medium, and the programs, when executed, may include the processes of the foregoing method embodiments. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The foregoing disclosure is merely preferred embodiments of this application, and certainly is not intended to limit the protection scope of this application. Therefore, equivalent variations made in accordance with the claims of this application shall fall within the scope of this application.

What is claimed is:

1. A method for recommending a point of interest (POI) for location-based services (LBSs), the method comprising:
   determining, by a device comprising a memory storing instructions and a processor in communication with the memory, a target region according to a location of a user, the target region being one of a plurality of geographic regions obtained by dividing an electronic map, a size for dividing the electronic map being selected based on Mercator coordinates;
   obtaining, by the device, at least one target POI in the target region, the at least one target POI being selected according to an influence, the influence comprising at least one of a target-region influence, a user-centered-window influence, and a fused-region influence, wherein:

the target-region influence comprises an influence of a POI affecting the target region being a geographic region, the user-centered-window influence comprises an influence of a POI affecting a user-centered window overlapping with at least one geographic region, and the user-centered-window influence is obtained by:

creating the user-centered window by using the location of the user as a center, obtaining quantities of check-ins of the POI affecting regions overlapping with the user-centered window in the regions overlapping with the user-centered window, and obtaining quantities of presentations of the POI affecting the regions overlapping with the user-centered window in the regions overlapping with the user-centered window, the POI being any POI affecting the regions overlapping with the user-centered window, wherein the quantity of check-ins and the quantity of presentations are obtained through statistic collection in a preset time cycle, performing weighted summation on the quantities of check-ins of the POI in the regions overlapping with the user-centered window to obtain a second quantity of check-ins of the POI, and performing weighted summation on the quantities of presentations of the POI in the regions overlapping with the user-centered window to obtain a second quantity of presentations of the POI, wherein, for each region overlapping with the user-centered window, a weight for the weighted summation is a ratio of an overlapping area size between the each region and the user-centered window to a total area size of the user-centered window, and determining the user-centered-window influence of the POI according to the second quantity of check-ins and the second quantity of presentations, and the fused-region influence comprises an influence of a POI affecting a fused region comprising at least one geographic region; and outputting, by the device, the at least one target POI.

2. The method according to claim 1, wherein the obtaining the at least one target POI comprises:
obtaining, by the device, influences of POIs;
sorting, by the device, the POIs in descending order according to the influences; and
selecting, by the device, the at least one target POI according to a sorted order.

3. The method according to claim 1, wherein the obtaining the least one target POI comprises:
obtaining, by the device, influences of POIs, the influences comprising at least two influences of the target-region influence, the user-centered-window influence, or the fused-region influence;
determining, by the device, comprehensive influences of the POIs according to the at least two influences corresponding to each POI; and
selecting, by the device, the at least one target POI according to the comprehensive influences of the POIs.

4. The method according to claim 3, wherein:
the influence comprises the target-region influence; and
the obtaining the influences of the POIs affecting the target region comprises:
obtaining, by the device, a first quantity of check-ins and a first quantity of presentations of a first POI affecting the target region in the target region, the first POI being any POI affecting the target region, and
determining, by the device, a target-region influence of the first POI in the target region according to the first quantity of check-ins and the first quantity of presentations.

5. The method according to claim 1, wherein:
the influence comprises the user-centered-window influence.

6. The method according to claim 3, wherein:
the influence comprises the fused-region influence; and
the obtaining the influences of the POIs affecting the fused region comprises:
using, by the device, the target region and at least one region adjacent to the target region as a fused region;
obtaining, by the device, quantities of check-ins and quantities of presentations of a first POI affecting regions in the fused region in the regions in the fused region, the first POI being any POI affecting the regions in the fused region;
performing, by the device, weighted summation on the quantities of check-ins of the first POI in the regions in the fused region to obtain a third quantity of check-ins of the first POI in the target region, and performing weighted summation on the quantities of presentations of the first POI in the regions in the fused region to obtain a third quantity of presentations of the first POI in the target region; and
determining, by the device, a fused-region influence of the first POI according to the third quantity of check-ins and the third quantity of presentations.

7. The method according to claim 6, further comprising:
obtaining, by the device, a preset distance and a spacing distance between a center point of a second region and the location of the user, the second region being any region in the fused region;
selecting, by the device, a larger distance of the preset distance and the spacing distance; and
determining, by the device, a ratio of the preset distance to the selected larger distance as a weight of the quantity of check-ins or the quantity of presentations of the first POI in the second region.

8. A device for recommending a point of interest (POI) for location-based services (LBSs), the device comprising:
a memory storing instructions; and
a processor in communication with the memory, wherein, when the processor executes the instructions, the processor is configured to cause the device to:
determine a target region according to a location of a user, the target region being one of a plurality of geographic regions obtained by dividing an electronic map, a size for dividing the electronic map being selected based on Mercator coordinates,
obtain at least one target POI in the target region, the at least one target POI being selected according to an influence, the influence comprising at least one of a target-region influence, a user-centered-window influence, and a fused-region influence, wherein:
the target-region influence comprises an influence of a POI affecting the target region being a geographic region,
the user-centered-window influence comprises an influence of a POI affecting a user-centered window overlapping with at least one geographic region, and the user-centered-window influence is obtained by:

creating the user-centered window by using the location of the user as a center, obtaining quantities of check-ins of the POI affecting regions overlapping with the user-centered window in the regions overlapping with the user-centered window, and obtaining quantities of presentations of the POI affecting the regions overlapping with the user-centered window in the regions overlapping with the user-centered window, the POI being any POI affecting the regions overlapping with the user-centered window, wherein the quantity of check-ins and the quantity of presentations are obtained through statistic collection in a preset time cycle, performing weighted summation on the quantities of check-ins of the POI in the regions overlapping with the user-centered window to obtain a second quantity of check-ins of the POI, and performing weighted summation on the quantities of presentations of the POI in the regions overlapping with the user-centered window to obtain a second quantity of presentations of the POI, wherein, for each region overlapping with the user-centered window, a weight for the weighted summation is a ratio of an overlapping area size between the each region and the user-centered window to a total area size of the user-centered window, and determining the user-centered-window influence of the POI according to the second quantity of check-ins and the second quantity of presentations, and the fused-region influence comprises an influence of a POI affecting a fused region comprising at least one geographic region, and output the at least one target POI.

9. The device according to claim 8, wherein, when the processor is configured to cause the device to obtain the at least one target POI, the processor is configured to cause the device to:

obtain influences of POIs;

sort the POIs in descending order according to the influences; and select the at least one target POI according to a sorted order.

10. The device according to claim 8, wherein, when the processor is configured to cause the device to obtain the at least one target POI, the processor is configured to cause the device to:

obtaining influences of POIs, the influences comprising at least two influences of the target-region influence, the user-centered-window influence, or the fused-region influence;

determining comprehensive influences of the POIs according to the at least two influences corresponding to each POI; and selecting the at least one target POI according to the comprehensive influences of the POIs.

11. The device according to claim 10, wherein:
the influence comprises the target-region influence; and
when the processor is configured to cause the device to obtain the influences of the POIs affecting the target region, the processor is configured to cause the device to:

obtain a first quantity of check-ins and a first quantity of presentations of a first POI affecting the target region in the target region, the first POI being any POI affecting the target region, and determine a target-region influence of the first POI in the target region according to the first quantity of check-ins and the first quantity of presentations.

12. The device according to claim 10, wherein:
the influence comprises the fused-region influence;
when the processor is configured to cause the device to obtain the influences of the POIs affecting the target region, the processor is configured to cause the device to:

use the target region and at least one region adjacent to the target region as a fused region;

obtain quantities of check-ins and quantities of presentations of a first POI affecting regions in the fused region in the regions in the fused region, the first POI being any POI affecting the regions in the fused region;

perform weighted summation on the quantities of check-ins of the first POI in the regions in the fused region to obtain a third quantity of check-ins of the first POI in the target region, and perform weighted summation on the quantities of presentations of the first POI in the regions in the fused region to obtain a third quantity of presentations of the first POI in the target region; and determine a fused-region influence of the first POI according to the third quantity of check-ins and the third quantity of presentations; and when the processor executes the instructions, the processor is configured to further cause the device to:

obtain a preset distance and a spacing distance between a center point of a second region and the location of the user, the second region being any region in the fused region, select a larger distance of the preset distance and the spacing distance, and determine a ratio of the preset distance to the selected larger distance as a weight of the quantity of check-ins or the quantity of presentations of the first POI in the second region.

13. A non-transitory computer readable storage medium storing computer readable instructions, the computer readable instructions, when executed by a processor, causing the processor to perform:

determining a target region according to a location of a user, the target region being one of a plurality of geographic regions obtained by dividing an electronic map, a size for dividing the electronic map being selected based on Mercator coordinates;

obtaining at least one target POI in the target region, the at least one target POI being selected according to an influence, the influence comprising at least one of a target-region influence, a user-centered-window influence, and a fused-region influence, wherein:

the target-region influence comprises an influence of a POI affecting the target region being a geographic region, the user-centered-window influence comprises an influence of a POI affecting a user-centered window overlapping with at least one geographic region, and the user-centered-window influence is obtained by:
creating the user-centered window by using the location of the user as a center, obtaining quantities of check-ins of the POI affecting regions overlapping with the user-centered window in the regions overlapping with the user-centered window, and obtaining quantities of presentations of the POI affecting the regions overlapping with the user-centered window in the regions overlapping with the user-centered window, the POI being any POI affecting the regions overlapping with the user-centered window, wherein the quantity of check-ins and the quantity of presentations are obtained through statistic collection in a preset time cycle, performing weighted summation on the quantities of check-ins of the POI in the regions overlapping with the user-centered window to obtain a second quantity of check-ins of the POI, and performing weighted summation on the quantities of presentations of the POI in the regions overlapping with the user-centered window to obtain a second quantity of presentations of the POI, wherein, for each region overlapping with the user-centered window, a weight for the weighted summation is a ratio of an overlapping area size between the each region and the user-centered window to a total area size of the user-centered window, and determining the user-centered-window influence of the POI according to the second quantity of check-ins and the second quantity of presentations, and the fused-region influence comprises an influence of a POI affecting a fused region comprising at least one geographic region; and outputting the at least one target POI.

14. The non-transitory computer readable storage medium according to claim 13, wherein, when the computer readable instructions cause the processor to perform obtaining the at least one target POI, the computer readable instructions cause the processor to perform:

obtaining influences of POIs;

sorting the POIs in descending order according to the influences; and selecting the at least one target POI according to a sorted order.

15. The non-transitory computer readable storage medium according to claim 13, wherein, when the computer readable instructions cause the processor to perform obtaining the least one target POI, the computer readable instructions cause the processor to perform:

obtaining influences of POIs, the influences comprising at least two influences of the target-region influence, the user-centered-window influence, or the fused-region influence;

determining comprehensive influences of the POIs according to the at least two influences corresponding to each POI; and selecting the at least one target POI according to the comprehensive influences of the POIs.

16. The non-transitory computer readable storage medium according to claim 15, wherein:

the influence comprises the target-region influence; and when the computer readable instructions cause the processor to perform obtaining the influences of the POIs affecting the target region, the computer readable instructions cause the processor to perform:

obtaining a first quantity of check-ins and a first quantity of presentations of a first POI affecting the target region in the target region, the first POI being any POI affecting the target region, and determining a target-region influence of the first POI in the target region according to the first quantity of check-ins and the first quantity of presentations.

17. The non-transitory computer readable storage medium according to claim 15, wherein:

the influence comprises the fused-region influence;

when the computer readable instructions cause the processor to perform obtaining the influences of the POIs affecting the target region, the computer readable instructions cause the processor to perform:

using the target region and at least one region adjacent to the target region as a fused region;

obtaining quantities of check-ins and quantities of presentations of a first POI affecting regions in the fused region in the regions in the fused region, the first POI being any POI affecting the regions in the fused region;

performing weighted summation on the quantities of check-ins of the first POI in the regions in the fused region to obtain a third quantity of check-ins of the first POI in the target region, and performing weighted summation on the quantities of presentations of the first POI in the regions in the fused region to obtain a third quantity of presentations of the first POI in the target region; and determining a fused-region influence of the first POI according to the third quantity of check-ins and the third quantity of presentations; and the computer readable instructions, when executed by a processor, further cause the processor to perform:

obtaining a preset distance and a spacing distance between a center point of a second region and the location of the user, the second region being any region in the fused region, selecting a larger distance of the preset distance and the spacing distance, and determining a ratio of the preset distance to the selected larger distance as a weight of the quantity of check-ins or the quantity of presentations of the first POI in the second region.

* * * * *